(12) United States Patent
Fielden et al.

(10) Patent No.: US 6,357,710 B1
(45) Date of Patent: Mar. 19, 2002

(54) ITEM HOLDING DEVICE

(76) Inventors: Steven S. Fielden, 1039 Estate Dr., Johnson City, TN (US) 37604; Robert J. Beals, II, 969 Hwy. 107, Jonesborough, TN (US) 37659

( * ) Notice: Subject to any disclaimer, the term of this patent is extended or adjusted under 35 U.S.C. 154(b) by 0 days.

(21) Appl. No.: 09/558,012

(22) Filed: Apr. 25, 2000

(51) Int. Cl.[7] .............................................. A44B 21/00
(52) U.S. Cl. .............................. 248/276.1; 248/231.51; 248/316.5
(58) Field of Search ..................... 248/229.13, 229.23, 248/230.4, 231.51, 231.85, 274.1, 276.1, 316.5, 104

(56) References Cited

U.S. PATENT DOCUMENTS

| | | | | |
|---|---|---|---|---|
| 1,786,459 A | * | 12/1930 | Simons | 248/104 |
| 2,110,037 A | * | 3/1938 | De Rosa | 248/104 |
| 4,114,847 A | * | 9/1978 | Bogensberger | 248/104 |
| 5,135,189 A | * | 8/1992 | Ghazizadeh | 248/104 |
| 5,489,075 A | * | 2/1996 | Ible | 248/104 |
| 5,774,950 A | * | 7/1998 | Stout | 24/298 |
| 5,823,486 A | * | 10/1998 | Smith et al. | 248/104 |
| 5,853,158 A | * | 12/1998 | Riggle | 248/311.2 |
| 5,940,980 A | * | 8/1999 | Lee et al. | 34/97 |
| 5,997,047 A | * | 12/1999 | Pimentel et al. | 285/55 |

* cited by examiner

Primary Examiner—Anita King
Assistant Examiner—Jon A Szumny

(57) ABSTRACT

An item holding device, having a multi-segmented arm wherein each segment is connected to each adjacent segment by a swivel joint having a substantial fictional resistance to motion, wherein a first quick release clamp is provided on one end of the arm, wherein a second such clamp or the base of an item is provided on the other end of the arm, and wherein the first clamp is adapted for gripping an action-site member whereby an item can be held in a desired position at the action-site.

13 Claims, 2 Drawing Sheets

ITEM HOLDING DEVICE

BACKGROUND OF THE INVENTION

1. Field

This invention resides in the field of devices used for holding in a desired posture and location on a work or action-site member or structure, primarily temporarily, various types of items such as worklights, flashlights, umbrellas, tools, workpieces, market items, or the like, whereby the hands of the user are free to perform other functions such as looking for or loading items in an automobile trunk at night or in the rain.

The present device is particulary useful for supporting items on a member of an automobile such as the trunk lid or engine lid or a door frame, or on a partially open window, or on a member of lawn chairs, strollers or the like, whereby, in accordance with the present invention, the device can be secured to said member and to said items by quick release clamp means, and whereby the device can be manipulated to orient the item and maintain it in a desired posture against substantial disorientation forces.

The present device in one particular exemplary embodiment is designed to attach an opened umbrella to an automobile trunk lid. It addresses the difficulty of balancing an umbrella in one hand on rainy days while attempting to remove, store or search for items within the trunk area of a vehicle. The device is particularly useful to the individual who may not be strong enough to readily hold an umbrella in one hand, such as persons having hand or arm problems, e.g., carpal tunnel or arthritis. As such, a function of this device is to keep an individual relatively dry during inclement weather while allowing the individual to load or unload items within the cargo area while the umbrella is secured, hands-free, over both the individual and the trunk.

2. Prior Art

Applicant is unaware of any structurally similar prior devices which can perform the same functions in an equally effective manner as the present device.

SUMMARY OF THE INVENTION

The present holding device, in one of its preferred embodiments comprises a multi-segmented arm means having a dynamic longitudinal axis, wherein each segment is connected to each adjacent segment by swivel joint means having a substantial frictional resistance to motion, and wherein a quick release clamp means is provided on each end of said arm means, one said clamp means being adapted for gripping and holding an item, and the other said clamp means being adapted for gripping an action-site member.

Other preferred embodiments are given in the dependent claims herein.

BRIEF DESCRIPTION OF THE DRAWINGS

The invention will be further understood from the following drawings and description of preferred embodiments, wherein the figures are not necessarily drawn to scale and certain structural portions are broken away for clarity, and wherein:

FIG. 6 is a partial view as in FIG. 1 and showing a variation in utility of the device.

DETAILED DESCRIPTION OF INVENTION

Figure 1:
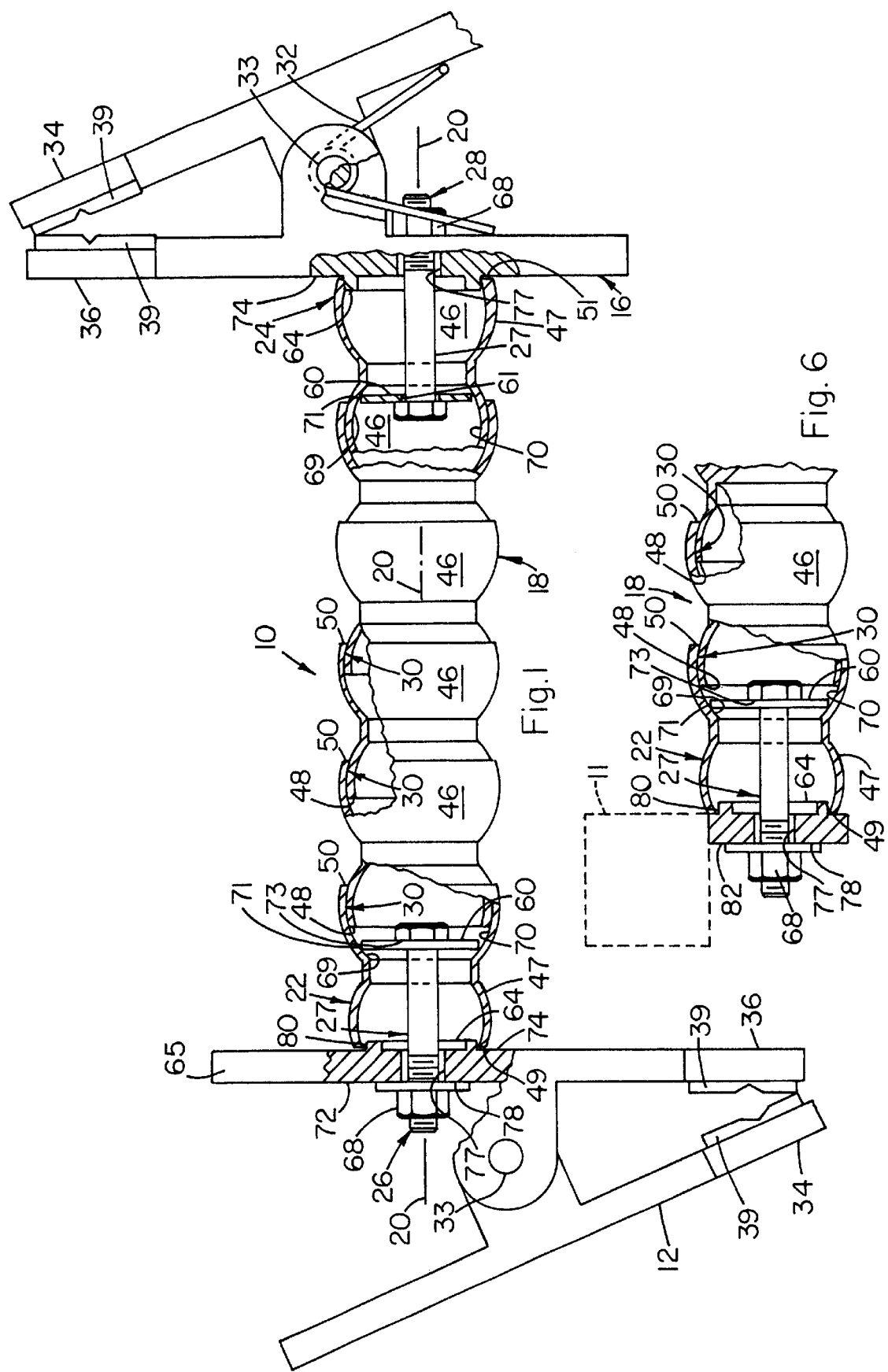
FIG. 1 is a side view of the present device with portions broken away for clarity.
Figure 2:
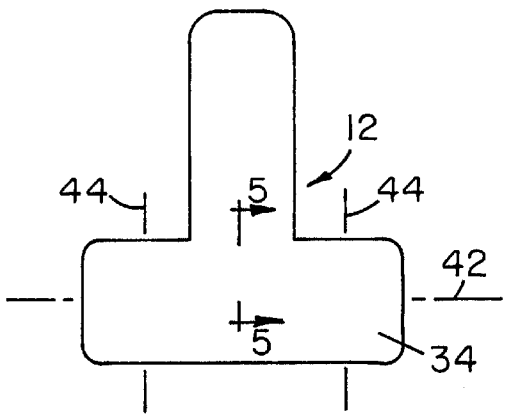
FIG. 2 is a front view of a clamp.
Figure 3:
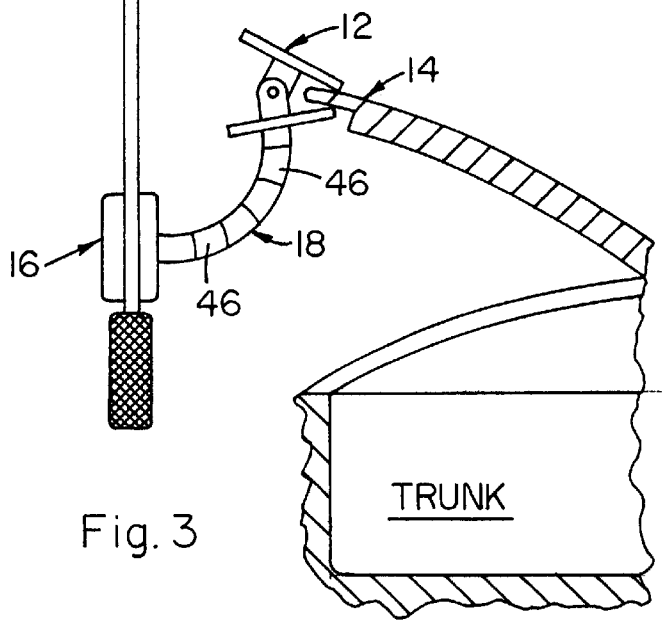
FIG. 3 is a partially cross-sectional view showing the present device holding an umbrella onto an open trunk lid of an automobile.
Figure 5:
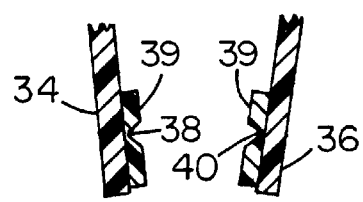
FIG. 5 is a cross-sectional view of the gripping ends of the jaws taken along line 5—5 in FIG. 2 in the direction of the arrows.

Referring to the drawings and with particular reference to the claims hereof, the present device 10 in one preferred embodiment, for holding an umbrella, flash light, or other item 11 which are typically hand held by the user, comprises a first clamping means 12 adapted for attachment to an action-site member or structure such as the trunk lid 14 of an automobile, second clamping means 16 adapted for firmly holding one or more of said items, arm means 18 having a variable, functional axis 20 and having first 22 and second 24 end portions, first connector means 26 affixing said first clamping means to said first end portion, and second connector means 28 affixing said second clamping means to said second end portion, wherein at least one of said connector means provides for angular adjustment of its associated clamping means around said functional axis, wherein said arm means is provided with swivel motion joint means 30 whereby said arm means can be twisted in any direction either around or to alter said functional axis, and wherein said joint means imparts a predesigned deflection resistance to said arm means.

The clamping means may be of any material, preferably plastic, and of a generally clothes-pin type configuration as shown, or its configuration can be varied widely depending on the use to be made of the present device. A torsion spring such as 32 mounted on pivot pin 3 in known manner, or an equivalent force generating means is provided to continually urge the gripping ends 34,36 of each clamping means toward each other with considerable force such as, for example, sufficient to hold an umbrella in a wind.

The gripping ends 34, 36 are preferably provided with rubber or the like pads 39 which are preferably serrated as at 38, 40 in any desired direction of the gripping ends, e.g., longitudinally as along 42 or laterally as along 44, or diagonally or knurled, in order to be able to easily grip and hold items having different shapes.

The arm 18 of any desired length, e.g., 8–20 in., of plastic or metal but preferably of tough, resilient plastic such as cellulose ester, polyolefin, PVC, Nylon or the like, is comprised of a series of segments 46, circularly configured around axis 20, each of which has a male insert end 48 and a female receptor end 50. Any number of these segments are assembled by forcing ends 48 into ends 50, or disassembled by reverse pulling action. The thickness and elasticity of the walls of these segments, and other such properties, will, as selected by the manufacturer determine the frictional opposition to assembly or disassembly, e.g., 40–100 lbs., of pull. Likewise, such properties will determine the frictional opposition to swiveling motion between the segments and thus the "deflection resistance" of the arm. One particularly useful type of such segment is marketed as Loc-Line®. Other useful type segments or joints include flexible metal or flexible plastic conduit which is bent only by force and remains in the bent position until rebent.

Figure 4:
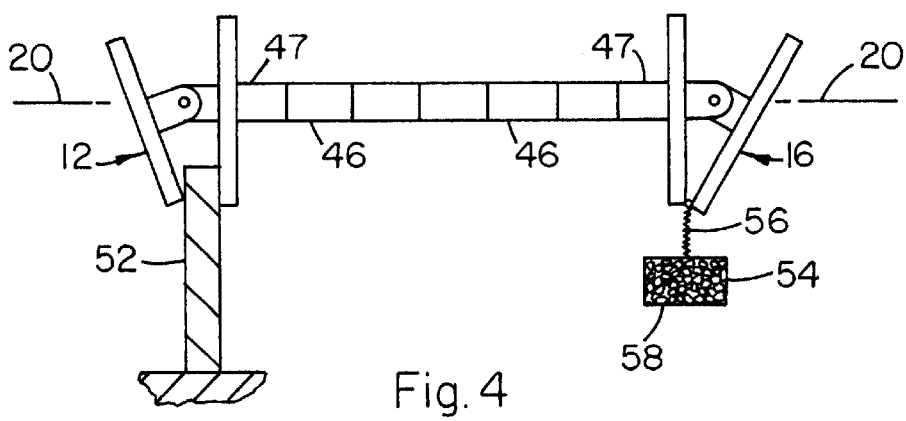
FIG. 4 shows how deflection resistance of the present arm means is determined.

This resistance to swiveling motion is a direct measurement in pounds required to start the downward deflection of the arm from its straight axial posture in FIG. 1. It is measured as shown in FIG. 4, by clamping 12 to a test base 52, clamping a container 54 to clamp 16 or any other type of clamp or retaining structure by cord 56, and adding weights 58 to the container until movement within one or more joint means 30 occurs. The total weight in pounds of 16,54, 56,58 and the connector means 28 is then measured to give the deflection resistance. The total length of the arm is immaterial to this measurement. It is preferred, for many day-to-day uses, that the deflection resistance be sufficient i.e., from about 2–10 lbs to hold an average size umbrella in a stable posture in a light wind. However, the arm means may be manufactured to have any deflection resistance desired, e.g., 50 lbs. or more where hearts items such as a tool box or the like is being supported by the arm means.

The base or clamps are preferably secured to the end segments by the mechanism shown in FIGS. 1 and 6 wherein a circular stop washer means 60 is positioned laterally of axis 20 and has its periphery 71 wedged against a necked down portion 69 of inner circular wall means 70 of a female receptor end 50 or of a male insert end 48 of an end segment 47. A bolt 27 is mounted thru an aperture 61 in the stop washer and has its head or shoulder means 73 bearing against the stop washer means. This bolt extends thru aperture 77 in the base 82 or a clamp arm portion 72 of the clamping means and the male insert end face 49 or female receptor end face 51 of end segment 47 bears against proximal surface 74 of the base or arm portion. Tightening means or nut 68, preferably a lock nut such as Nylon on the bolt applies force against distal surface 78 of the base or arm portion 72 to tighten the stop washer means 60 against the necked down portion 69 and to tightly but slidably engage said end face 49 or 51 with the proximal surface 74.

It is highly preferred that a substantially circular rim 64 is provided on proximal surface 74 surrounding aperture 77 and having its periphery 80 positioned adjacent the inner surface of wall means 70 of end segment 47 to thereby prevent lateral slippage and dislocation of the end segment on proximal surface 74.

Referring to FIG. 6 wherein equivalent structures to the device of FIG. 1 are numbered the same, the item 11 is provided with its own base means 82 either attached to or integrally formed with the item as in a plastic molding or metal casting operation. The base means is provided with the necessary structure and configuration for attachment to arm means 18 as in FIG. 1.

The invention has been described in detail with particular reference to preferred embodiments thereof, but it will be understood that variations and modifications will be effected with the spirit and scope of the invention.

We claim:

1. A device operable by a user for holding in a desired posture at an action site, an umbrella, flash light, or other such item which is typically hand held by the user, said device comprising first clamping means adapted for attachment to an action-site structure, second clamping means adapted for firmly holding one or more of said items, a multi-segmented arm having a variable functional axis and having first and second end portions, first connector means affixing said first clamping means to said first end portion, and second connector means affixing said second clamping means to said second end portion, wherein at least one of said connector means provides for angular adjustment of its associated clamping means around said functional axis, said segments providing a plurality of swivel joint means having substantial frictional resistance to movement whereby said arm can be twisted or deflected in any direction to vary said functional axis and remain in the deflected position against forces applied to said arm, wherein said joint means imparts a predesigned deflection resistance to said arm, wherein at least one of said connector means comprises a circular stop washer positioned laterally of said axis and having its periphery wedged against a necked down portion of an inner circular wall portion of a female receptor end or of a male insert end of an end segment, a bolt mounted thru an aperture in said stop Washer and having a shoulder bearing against the stop washer, said bolt extending thru an aperture in a clamp arm portion of a said clamping means, the male insert end face or female receptor end face of said end segment bearing against a proximal surface of said clamp arm portion, and tightening means on said bolt for applying force against a distal surface of said clamp arm portion to tighten said stop washer against said necked down portion and to tightly but slidably engage said end face with said proximal surface.

2. The device of claim 1 wherein each said clamping means is rotatable mounted on said arm means for rotation about said FUNCTIONAL axis.

3. The device of claim 1 wherein said joint means is of the ball and socket type and comprised of compression fitted parts of tough, resilient plastic.

4. The device of claim 1 wherein each said clamping means comprises a pivotally connected, normally spring closed pair of jaws, at least one of which jaws is provided with at least one serration for holding an item in a stable position between said jaws.

5. The device of claim 1 wherein each said joint means comprises adjacent segments wherein each segment has a ball section on one of its ends and a socket section on the other end of its ends.

6. The device of claim 1 wherein a substantially circular rim means is provided on said proximal surface surrounding said aperture and having its periphery positioned adjacent the inner surface of wall means of an end segment to thereby prevent lateral slippage and dislocation of said end segment on said proximal surface.

7. The device of claim 1 wherein said frictional resistance is measured as a deflection resistance and ranges from about 2 to about 10 pounds.

8. A device operable by a user for holding in a desired posture at an action site, an umbrella, flash light, or other such item which is typically hand held by the user, said device comprising clamping means adapted for attachment to an action-site structure, base means adapted for firmly holding one or more of said items, a multi-segmented arm having a variable functional axis and having first and second end portions, first connector means affixing said clamping means to said first end portion, and second connector means affixing said base means to said second end portion, wherein at least one of said connector means provides for angular adjustment of its associated clamping or base means around said functional axis, said segments providing a plurality of swivel joint means having substantial frictional resistance to movement whereby said arm can be twisted or deflected in any direction to vary said functional axis and remain in the deflected position against forces applied to said arm, wherein said joint means imparts a predesigned deflection resistance to said arm, wherein at least one of said connector means comprises a circular stop washer positioned laterally of said axis and having its periphery wedged against a necked dozen portion of an inner circular wall portion of a female receptor end or of a male insert end of an end segment, a bolt mounted thru an aperture in said stop washer and having a shoulder bearing against the stop washer, said bolt extending thru an aperture in at least one of said base means or a clamp arm portion of a said clamping means, the male insert end face or female receptor end face of said end segment bearing against a proximal surface of said base means or clamp arm portion, and tightening means on said bolt for applying force against a distal surface of said base means or clamp arm portion to tighten said stop washer means against said necked down portion and to tightly but slidably engage said end face with said proximal surface.

9. The device of claim 8 wherein said clamping means is rotatably mounted on said arm means for rotation about said longitudinal axis.

10. The device of claim 8 wherein said joint means is of the ball and socket type and comprised of compression fitted parts of tough, resilient plastic.

11. The device of claim 8 wherein a substantially circular rim means is provided on said proximal surface surrounding said aperture and having its periphery positioned adjacent the inner surface of wall means of an end segment to thereby prevent lateral slippage and dislocation of said end segment on said proximal surface.

12. A device operable by a user for holding in a desired posture at an action site, an umbrella, flash light, or other such item which is typically hand held by the user, said device comprising first clamping means adapted for attachment to an action-site structure, second clamping means adapted for firmly holding one or more of said items, a multi-segmented arm having a variable functional axis and having first and second end portions, first connector means affixing said first clamping means to said first end portion, and second connector means affixing said second clamping means to said second end portion, wherein at least one of said connector means provides for angular adjustment of its associated clamping means around said functional axis, said segments providing a plurality of swivel joint means having substantial frictional resistance to movement whereby said arm can be twisted or deflected in any direction to vary said functional axis and remain in the deflected position against forces applied to said arm, wherein said joint means imparts a predesigned deflection resistance to said arm, wherein each said connector means comprises a circular stop washer positioned laterally of said axis and having its periphery wedged against a necked down portion of an inner circular wall portion of an end segment, a bolt mounted thru an aperture in each said stop washer, each said bolt having a shoulder bearing against the associated stop washer, each said bolt extending thru an aperture in a clamp arm portion of a an associated clamping means, an end face of each said end segment bearing against a proximal surface of a clamp arm portion, and tightening means on each said bolt for applying force against a distal surface of a clamp arm portion to tighten the stop washers against the necked down portions and to tightly but slidably engage each said end face with a proximal surface of said clamp arm portion.

13. A device operable by a user for holding in a desired posture at an action site, an umbrella, flash light, or other such item which is typically hand held by the user, said device comprising clamping means adapted for attachment to an action-site stricture, base means adapted for firmly holding one or more of said items, a multi-segmented arm having a variable functional axis and having first and second end portions, first connector means affixing said clamping means to said first end portion, and second connector means affixing said base means to said second end portion, wherein at least one of said connector means provides for angular adjustment of its associated clamping or base means around said functional axis, said segments providing a plurality of swivel joint means having substantial frictional resistance to movement whereby said arm can be twisted or deflected in any direction to vary said functional axis and remain in the deflected position against forces applied to said arm, wherein said joint means imparts a predesigned deflection resistance to said arm, wherein each said connector means comprises a circular stop washer positioned laterally of said axis and having its periphery wedged against a necked down portion of an inner circular wall portion of an end segment, a bolt mounted thru an aperture in each stop washer, each said bolt having a shoulder bearing against the associated stop washer, each said bolt extending thru an aperture in at least one of said base means or a clamp arm portion of an associated clamping means, an end face of each said end segment bearing against a proximal surface of said base means or clamp arm portion, and tightening means on each said bolt for applying force against a distal surface of said base means or clamp arm portion to tighten the stop washers against the necked down portions and to tightly but slidably engage said end face with each said proximal surface of said base means or clamp arm portion.

* * * * *